(12) United States Patent
Yamada et al.

(10) Patent No.: US 11,613,100 B2
(45) Date of Patent: Mar. 28, 2023

(54) NOISE SUPPRESSION SHEET

(71) Applicant: TDK CORPORATION, Tokyo (JP)

(72) Inventors: Takashi Yamada, Tokyo (JP); Atsushi Sato, Tokyo (JP); Makoto Orikasa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 296 days.

(21) Appl. No.: 16/876,560

(22) Filed: May 18, 2020

(65) Prior Publication Data

US 2021/0354426 A1 Nov. 18, 2021

(51) Int. Cl.
*B32B 15/01* (2006.01)
*B32B 7/025* (2019.01)

(52) U.S. Cl.
CPC ............ *B32B 15/012* (2013.01); *B32B 7/025* (2019.01); *B32B 15/015* (2013.01); *B32B 2250/03* (2013.01); *B32B 2250/40* (2013.01); *B32B 2307/208* (2013.01); *B32B 2307/212* (2013.01); *B32B 2311/12* (2013.01); *B32B 2311/22* (2013.01); *B32B 2311/24* (2013.01); *B32B 2311/30* (2013.01); *B32B 2457/00* (2013.01); *Y10T 428/24975* (2015.01)

(58) Field of Classification Search
CPC ... B32B 15/012; B32B 7/025; B32B 2250/03; B32B 2307/208; B32B 2307/212; Y10T 428/24975
See application file for complete search history.

(56) References Cited

FOREIGN PATENT DOCUMENTS

| JP | 2000348307 A | * | 12/2000 |
| JP | 2001284108 A | * | 10/2001 |

OTHER PUBLICATIONS

[NPL-1] Awakura (JP 2001-284108 A), Oct. 12, 2001 (EPO machine translation to English). (Year: 2001).*
[NPL-2] Terunuma (JP 2000-348307 A), Dec. 15, 2000 (JPP machine translation to English). (Year: 2000).*

\* cited by examiner

*Primary Examiner* — David Sample
*Assistant Examiner* — Donald M Flores, Jr.
(74) *Attorney, Agent, or Firm* — Oliff PLC

(57) ABSTRACT

A noise suppression sheet comprises a pair of metal magnetic layers and a non-magnetic metal layer interposed between the pair of metal magnetic layers, and can achieve high magnetic shield characteristics on both surfaces.

5 Claims, 1 Drawing Sheet

NOISE SUPPRESSION SHEET

TECHNICAL FIELD

The present disclosure relates to a noise suppression sheet.

BACKGROUND

In recent years, along with increasing operation speed of a digital circuit in an electronic apparatus, erroneous operation of the electronic apparatus or an adverse effect on a human body caused by noise such as electromagnetic waves generated from the circuit has been deepening. For this reason, development of a noise suppression sheet for suppressing (blocking) noise has been progressed.

SUMMARY

The present inventors have performed research on the magnetic shielding characteristics of the noise suppression sheet, and as a result, have newly found a technology that achieves excellent magnetic shielding characteristics in the both surfaces.

The present disclosure provides a noise suppression sheet with improved magnetic shield characteristics in the both surfaces.

The noise suppression sheet according to an embodiment of the present disclosure comprises a pair of metal magnetic layers and a non-magnetic metal layer interposed between the pair of metal magnetic layers.

In the noise suppression sheet according to another aspect, the thickness of each of the metal magnetic layer is less than 0.5 to 10 μm.

In a noise suppression sheet according to another aspect, each of the metal magnetic layer is composed of a FeNi alloy, a FeSiAl alloy, a FeNiMo alloy, or a FeNiCo alloy.

In the noise suppression sheet according to another aspect, the thickness of the non-magnetic metal layer is 1 to 20 μm.

In the noise suppression sheet according to the other aspect, the non-magnetic metal layer is composed of at least one selected from the group consisting of Cu and Al.

DETAILED DESCRIPTION

Figure 1:
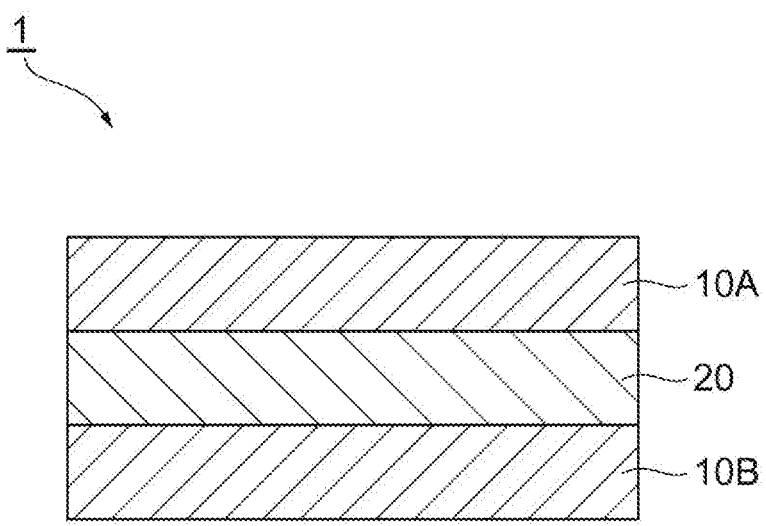
FIG. 1 is a schematic sectional view showing one embodiment of a noise suppression sheet.

Some embodiments of the present disclosure are described below, with reference as necessary to the drawings. However, the present disclosure is not limited to the following embodiments.

FIG. 1 is a schematic sectional view showing one embodiment of a noise suppression sheet. The noise suppression sheet 1 shown in FIG. 1 comprises a pair of metal magnetic layers 10A and 10B and a non-magnetic metal layer 20. More specifically, the noise suppression sheet 1 has a three-layer structure, and has a configuration in which the non-magnetic metal layer 20 is interposed between a pair of metal magnetic layers 10A and 10B. From the viewpoint of thinning, the noise suppression sheet 1 is designed so that its thickness is 100 μm or less.

For a pair of metal magnetic layers 10A and 10B, each of the layers is a foil or a thin film composed of a magnetic material, and is composed of, for example, a FeNi alloy (permalloy), silicon steel sheet, or a FeSiAl alloy (sendust). In the present embodiment, each of the metal magnetic layers 10A and 10B is composed of a FeNi alloy containing 70 to 84 wt % of Ni and containing 16 to 30 wt % of Fe. Each of the metal magnetic layers 10A and 10B may be an alloy in which Mo is added to FeNi (FeNiMo alloy), or may be an alloy in which Co is added to FeNi (FeNiCo alloy). Mo or Co may be added at 2 to 8 wt %. The constituent material of the metal magnetic layer 10A and the constituent material of the metal magnetic layer 10B may be the same or different. The metal magnetic layers 10A and 10B have a high magnetic permeability and can function as a magnetic shield layer that absorbs noise.

The thickness of each of the metal magnetic layers 10A and 10B is designed to be 0.5 to 10 μm (5 μm as an example). From the viewpoint of thinning the noise suppression sheet 1, the thickness of each of the metal magnetic layers 10A and 10B may be 7 μm or less or 5 μm or less. From the viewpoint of more effectively absorbing noise, the thickness of each of the metal magnetic layers 10A and 10B may be 1 μm or more or 3 μm or more. The thickness of the metal magnetic layer 10A and the thickness of the metal magnetic layer 10B may be the same or different.

Each of the metal magnetic layers 10A and 10B is designed to have a high electrical resistivity, and the electrical resistivity of each of the metal magnetic layers 10A and 10B according to the present embodiment is 70 to 115 μΩ·cm (95 μΩ·cm as an example).

When the metal magnetic layers 10A and 10B are foils (or sheets), the metal magnetic layers 10A and 10B can be obtained by, for example, rolling or sheeting. When the metal magnetic layers 10A and 10B are thin films, the metal magnetic layers 10A and 10B can be obtained by coating or plating (electrolytic plating or electroless plating).

The non-magnetic metal layer 20 is a foil or thin film composed of a non-magnetic metal. Examples of the non-magnetic metal constituting the non-magnetic metal layer 20 include Cu, Al, Sn, and Bi. The non-magnetic metal layer 20 may be composed of a single non-magnetic metal or a plurality of non-magnetic metals having different metal species. The non-magnetic metal layer 20 according to the present embodiment is composed of at least one selected from the group consisting of Cu and Al. The non-magnetic metal layer 20 functions as an electromagnetic wave shield that reflects electromagnetic noise.

The thickness of the non-magnetic metal layer 20 is designed to be 1 to 20 μm (for example, 10 μm). The thickness of the non-magnetic metal layer 20 may be 5 μm or more from the viewpoint of effectively reflecting electromagnetic noise, and may be 15 μm or less or 10 μm or less, from the viewpoint of thinning the noise suppression sheet 1.

When the non-magnetic metal layer 20 is a foil (or sheet), the non-magnetic metal layer 20 can be obtained by, for example, rolling or sheeting. When the non-magnetic metal layer 20 is a thin film, the non-magnetic metal layer 20 can be obtained by electrolytic processing or vapor deposition.

The method of obtaining the noise suppression sheet 1 in which the metal magnetic layers 10A and 10B and the non-magnetic metal layer 20 overlap is not particularly limited, and various methods can be employed.

For example, when the metal magnetic layers 10A and 10B and the non-magnetic metal layer 20 are both foils, the noise suppression sheet 1 can be formed by bonding the metal magnetic layers 10A and 10B and the non-magnetic metal layer 20 together.

When the metal magnetic layers 10A and 10B are foils, the noise suppression sheet 1 can be formed by forming a thin non-magnetic metal layer 20 on the metal magnetic layers 10A and 10B due to coating or plating.

When the non-magnetic metal layer 20 is a foil, the noise suppression sheet 1 can be formed by forming thin metal magnetic layers 10A and 10B on the non-magnetic metal layer 20 due to electrolytic processing or vapor deposition.

The above noise suppression sheet 1 can absorb and suppress noise (magnetism, electromagnetic waves, and the like) generated from a circuit or the like in an electronic component by being mounted on the electronic component or the like. In the noise suppression sheet 1, noise is absorbed by the metal magnetic layers 10A and 10B. Noise that is transmitted without being absorbed by the metal magnetic layers 10A and 10B can be reflected by the non-magnetic metal layer 20 and can be absorbed again by the metal magnetic layers 10A and 10B, and hence the noise suppression sheet 1 can suppress noise effectively.

Particularly, the noise suppression sheet 1 has a structure in which the metal magnetic layers 10A and 10B are arranged on both surfaces of the non-magnetic metal layer 20 (sandwich structure), and therefore noise can be absorbed and suppressed on both surfaces.

Moreover, according to the noise suppression sheet 1, an excellent magnetic shielding characteristic is achievable. In the noise suppression sheet 1, particularly, a high electrical resistivity of 70 to 115 $\mu\Omega\cdot cm$ is achieved in the metal magnetic layers 10A and 10B, high magnetic permeability is maintained even in a high frequency band of about 1 MHz to 10 MHz, and the frequency dependence of the dielectric constant is reduced.

The noise suppression sheet 1 has high magnetic shield characteristics, and hence it can be thinned while maintaining practically sufficient magnetic shield characteristics as a noise suppression sheet.

In the noise suppression sheet 1, the thickness of each of the metal magnetic layers 10A and 10B is 0.5 to 10 $\mu m$, and thus the thinning and improved flexibility are achieved.

In the noise suppression sheet 1, the thickness of the non-magnetic metal layer 20 is 1 to 20 $\mu m$, and thus the thinning and improved flexibility are achieved.

What is claimed is:

1. A noise suppression sheet comprising:
   a pair of metal magnetic layers; and
   a non-magnetic metal layer interposed between the pair of metal magnetic layers, wherein the non-magnetic metal layer is composed of Cu, and a thickness of the non-magnetic metal layer is 1 to 20 $\mu m$.

2. The noise suppression sheet according to claim 1, wherein a thickness of each of the metal magnetic layers is 0.5 to 10 $\mu m$.

3. The noise suppression sheet according to claim 1, wherein each of the metal magnetic layers is composed of a FeNi alloy, a FeSiAl alloy, a FeNiMo alloy, or a FeNiCo alloy.

4. The noise suppression sheet according to claim 1, wherein each of the metal magnetic layers consists of a FeNi alloy, a FeSiAl alloy, a FeNiMo alloy, or a FeNiCo alloy.

5. The noise suppression sheet according to claim 1, wherein each of the metal magnetic layers has an electrical resistivity of 70 to 110 $\mu\Omega\cdot cm$.

* * * * *